US012391267B2

(12) United States Patent
Yoshikawa et al.

(10) Patent No.: US 12,391,267 B2
(45) Date of Patent: Aug. 19, 2025

(54) DRIVING SUPPORT DEVICE

(71) Applicant: HONDA MOTOR CO., LTD., Tokyo (JP)

(72) Inventors: Fumiaki Yoshikawa, Tokyo (JP); Hisanori Yanagida, Tokyo (JP); Takashi Watanabe, Tokyo (JP); Satoshi Matsushita, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 18/363,807

(22) Filed: Aug. 2, 2023

(65) Prior Publication Data
US 2024/0043028 A1 Feb. 8, 2024

(30) Foreign Application Priority Data
Aug. 8, 2022 (JP) .................................. 2022-126037

(51) Int. Cl.
*B60W 50/12* (2012.01)
*B60W 40/105* (2012.01)
(Continued)

(52) U.S. Cl.
CPC .......... *B60W 50/12* (2013.01); *B60W 40/105* (2013.01); *B60W 50/085* (2013.01);
(Continued)

(58) Field of Classification Search
CPC .. B60W 50/12; B60W 40/105; B60W 50/085; B60W 50/14; B60W 2050/143;
(Continued)

(56) References Cited

U.S. PATENT DOCUMENTS 9,481,345 B2 * 11/2016 Schneider ............. B60W 20/00
9,771,061 B2 * 9/2017 Tabata .................. B60W 30/06
(Continued)

FOREIGN PATENT DOCUMENTS

JP H04-123939 A 4/1992
JP 2017-121861 A 7/2017
JP 2021-2980 A 1/2021

OTHER PUBLICATIONS

Notice of Reasons for Refusal issued by the Japanese Patent Office on Nov. 28, 2023 in corresponding JP Patent Application No. 2022-126037, with English translation.

*Primary Examiner* — Sizo B Vilakazi
(74) *Attorney, Agent, or Firm* — Carter, DeLuca & Farrell LLP (57) ABSTRACT

A driving support device includes: an accelerator pedal operation detection unit configured to detect an accelerator pedal operation; an advancing direction detection unit configured to detect an advancing direction; a shift range detection unit configured to detect a shift range; a switchback determination unit configured to determine that a switchback state is occurring, in which the advancing direction that has been detected is different from an advancing direction based on the shift range; and a driving force limitation unit configured to limit a driving force in accordance with the accelerator pedal operation, in which the driving force limitation unit limits the driving force in accordance with the accelerator pedal operation, and also sets a limit amount of the driving force while the switchback state is occurring to be smaller than a limit amount of the driving force while no switchback state is occurring.

5 Claims, 4 Drawing Sheets (51) Int. Cl.
*B60W 50/08* (2020.01)
*B60W 50/14* (2020.01)

(52) U.S. Cl.
CPC ....... *B60W 50/14* (2013.01); *B60W 2050/143* (2013.01); *B60W 2050/146* (2013.01); *B60W 2520/06* (2013.01); *B60W 2540/10* (2013.01)

(58) Field of Classification Search
CPC ....... B60W 2050/146; B60W 2520/06; B60W 2540/10; B60W 10/06; B60W 2520/10; B60W 2540/12; B60W 2540/16; B60W 2540/20; B60W 2552/15; B60W 30/146; B60W 30/025; B60W 2510/0604; B60K 31/00
See application file for complete search history.

(56) References Cited

U.S. PATENT DOCUMENTS

| | | | |
|---|---|---|---|
| 2014/0025267 A1* | 1/2014 | Tezuka | B60W 30/18027 701/51 |
| 2017/0197506 A1 | 7/2017 | Inomata | |
| 2018/0126982 A1* | 5/2018 | Okamura | B60W 30/06 |
| 2024/0067177 A1* | 2/2024 | Yoshikawa | B60W 50/02 |

\* cited by examiner

DRIVING SUPPORT DEVICE

BACKGROUND

Technical Field

The present invention relates to a driving support device that supports driving of a driver by limiting a driving force in accordance with a traveling state of a vehicle.

Related Art

In these years, efforts are actively taken to provide access to a sustainable transportation system in consideration of vulnerable people such as elderly people, disabled people, and children among traffic participants. In order to achieve this, focus is given on research and development for further improving safety and convenience of traffic through developments related to improvements of behavior stability of vehicles.

As one of the developments related to the behavior stability of the vehicles, there is a known technique of controlling braking or driving force of the vehicle in order to avoid sudden acceleration resulting from an erroneous operation or the like of a driver, under a low-speed driving condition such as the time of starting or stopping the vehicle.

For example, JP 2017-121861 A discloses a driving support device including: first control means for decelerating, based on a collision possibility of a vehicle; second control means for stopping deceleration of the first control means, based on a driver's intention of acceleration; third control means for suppressing the acceleration when it is determined that a driving operation of the driver is an erroneous operation; and fourth control means for prohibiting the second control means from stopping the deceleration while the acceleration is being suppressed by the third control means.

In such a driving support device, it is prevented to stop the deceleration based on an erroneous decision that an erroneous operation of the driver is an intention of accelerating. For example, while pressing the accelerator pedal, when performing an operation of switching the shift position of the vehicle from a reverse range (R range) for moving the vehicle backward to a drive range (D range) for moving the vehicle forward, it is determined that the driver does not intend to accelerate forward, such an operation is considered to be an erroneous operation, and the acceleration of the vehicle is suppressed.

CITATION LIST

Patent Literature

Patent Literature 1: JP 2017-121861 A

SUMMARY

The technique described in JP 2017-121861 A may cause inconvenience in a traveling state called switchback in which the advancing direction (forward/backward) of the vehicle by the selected shift range does not match the actual advancing direction of the vehicle. For example, consideration is given to a case where the vehicle has been moved forward and parked (so-called forward parking) in a parking space such as a garage or a parking lot. In this case, when starting the vehicle, what's to be done is to set the shift switch/lever to the R range, move the vehicle backward to leave the parking space, switch the shift switch/lever to the D range, and move the vehicle forward to start moving.

In such a series of driving operations, when a driver who desires to promptly start the vehicle sets the shift switch/lever to the D range quickly while the vehicle is moving backward to promptly start moving the vehicle, the advancing direction (forward) of the shift range is different from the current advancing direction (backward) of the vehicle, and the above-described switchback state occurs.

In such a case, it can be considered that the accelerator operation of the driver in the D range intends to decelerate reverse travel in the switchback state and accelerate the vehicle in a correct travel direction. That is, it is considered that a sudden accelerator operation in the switchback state is not an erroneous operation but an intention of deceleration to prevent the reverse travel. However, in the technique described in JP 2017-121861 A described above, the sudden accelerator operation in such a situation is determined to be an erroneous operation, and the driving force in the forward direction that should have been obtained by the accelerator operation of the driver is limited to be small. As a result, there is a drawback that the deceleration in the reverse traveling state is delayed and the moving distance of the vehicle in the backward traveling state extends.

The present invention has been made to address such a drawback, and has an object to provide a driving support device capable of suppressing a reduction of deceleration force of a vehicle caused by the driving force of the vehicle being largely limited in a switchback state, and preventing an increase of a moving distance caused by the reverse travel of the vehicle. In addition, the driving support device contributes to developments of sustainable transportation systems.

In order to achieve such an object, a driving support device according to a first aspect of the present invention includes: an accelerator pedal operation detection unit (the ECU 2, the accelerator pedal sensor 12 in one embodiment, hereinafter, the same will apply in the present paragraph) configured to detect an accelerator pedal operation of a vehicle; an advancing direction detection unit (the ECU 2, the vehicle speed sensor 14) configured to detect an advancing direction at present of the vehicle; a shift range detection unit (the ECU 2, the shift position sensor 13) configured to detect a shift range at present of the vehicle; a switchback determination unit 3 configured to determine that a switchback state is occurring, in which the advancing direction that has been detected is different from an advancing direction based on the shift range that has been detected; and a driving force limitation unit 4 configured to limit a driving force of the vehicle in accordance with the accelerator pedal operation that has been detected, in which the driving force limitation unit 4 limits the driving force in accordance with the accelerator pedal operation that has been detected, and also sets a limit amount of the driving force while the switchback state is occurring to be smaller than a limit amount of the driving force while no switchback state is occurring.

According to such a driving support device, it is determined whether switchback traveling is being conducted in which the actual advancing direction of the vehicle and the advancing direction of the shift range do not match each other, based on the advancing direction of the vehicle and the shift range at present. Then, in a case where it is determined that the vehicle is in the switchback state, the limit amount of the driving force for preventing sudden acceleration caused by an erroneous operation is set to be smaller than that in the non-switchback state. Accordingly, in the non-switchback state, the sudden acceleration of the vehicle caused by an erroneous operation of the driver can be prevented, and in addition, in the switchback state, when the driver performs a large accelerator operation to eliminate the reverse traveling state, the driving force that has been generated by the accelerator operation can be caused to work on the vehicle, without the driving force being largely limited. Therefore, it is possible to provide a driving support device capable of suppressing a reduction of the deceleration force of the vehicle caused by the driving force of the vehicle being largely limited in the switchback state, and preventing an increase of a moving distance caused by the reverse travel of the vehicle.

According to a second aspect of the present invention, in the driving support device described in the first aspect, while the switchback state is occurring, the driving force limitation unit 4 minimizes the limit amount of the driving force.

According to this configuration, when it is determined that the vehicle is in the switchback state at present, the limit amount of the driving force for preventing the sudden acceleration caused by an erroneous operation is minimized. Accordingly, the driving force that has been generated by the accelerator operation of the driver for eliminating the reverse traveling state works on the vehicle with almost no limitation. Therefore, it is possible to provide a driving support device capable of further suppressing a reduction of the deceleration force of the vehicle caused by the driving force of the vehicle being limited in the switchback state, and more effectively preventing the increase of the moving distance caused by the reverse travel of the vehicle.

According to a third aspect of the present invention, in the driving support device described in the first aspect, while the switchback state is occurring, the driving force limitation unit 4 prohibits limitation of the driving force, regardless of the accelerator pedal operation that has been detected.

According to this configuration, when it is determined that the vehicle is in the switchback state at present, limitation of the driving force for preventing the sudden acceleration caused by an erroneous operation is not conducted, regardless of the accelerator pedal operation. Accordingly, the driving force that has been generated by the accelerator operation of the driver for eliminating the reverse traveling state works on the vehicle with no limitation. Therefore, it is possible to provide a driving support device capable of further suppressing a reduction of the deceleration force of the vehicle caused by the driving force of the vehicle being limited in the switchback state, and more effectively preventing the increase of the moving distance caused by the reverse travel of the vehicle in the switchback state.

According to a fourth aspect of the present invention, in the driving support device described in the third aspect, while the driving force limitation unit 4 prohibits the limitation of the driving force and no switchback state is occurring, the driving force limitation unit 4 cancels prohibition of the limitation of the driving force, and limits the driving force.

According to this configuration, when it is determined that the vehicle is in the switchback state at present, the driving force is not limited. However, thereafter, when the switchback state is released, limitation of the driving force is conducted again. Accordingly, the reverse traveling state of the vehicle is released by the accelerator operation of the driver in the switchback state, and the driving force is limited at the timing when the vehicle starts accelerating in the correct travel direction, so that sudden start of the vehicle can be prevented when the vehicle escapes from the switchback state.

According to a fifth aspect of the present invention, the driving support device described in the first aspect further includes a notification unit 5 configured to notify a driver of the vehicle, when at least a predetermined accelerator pedal operation is detected.

According to this configuration, a notification is given to the driver that the accelerator pedal operation has reached a predetermined one or more, regardless of whether the vehicle is in the switchback state, so that the driver can be made to recognize a possibility of sudden acceleration and to be conscious of safe driving.

DETAILED DESCRIPTION

Figure 1:
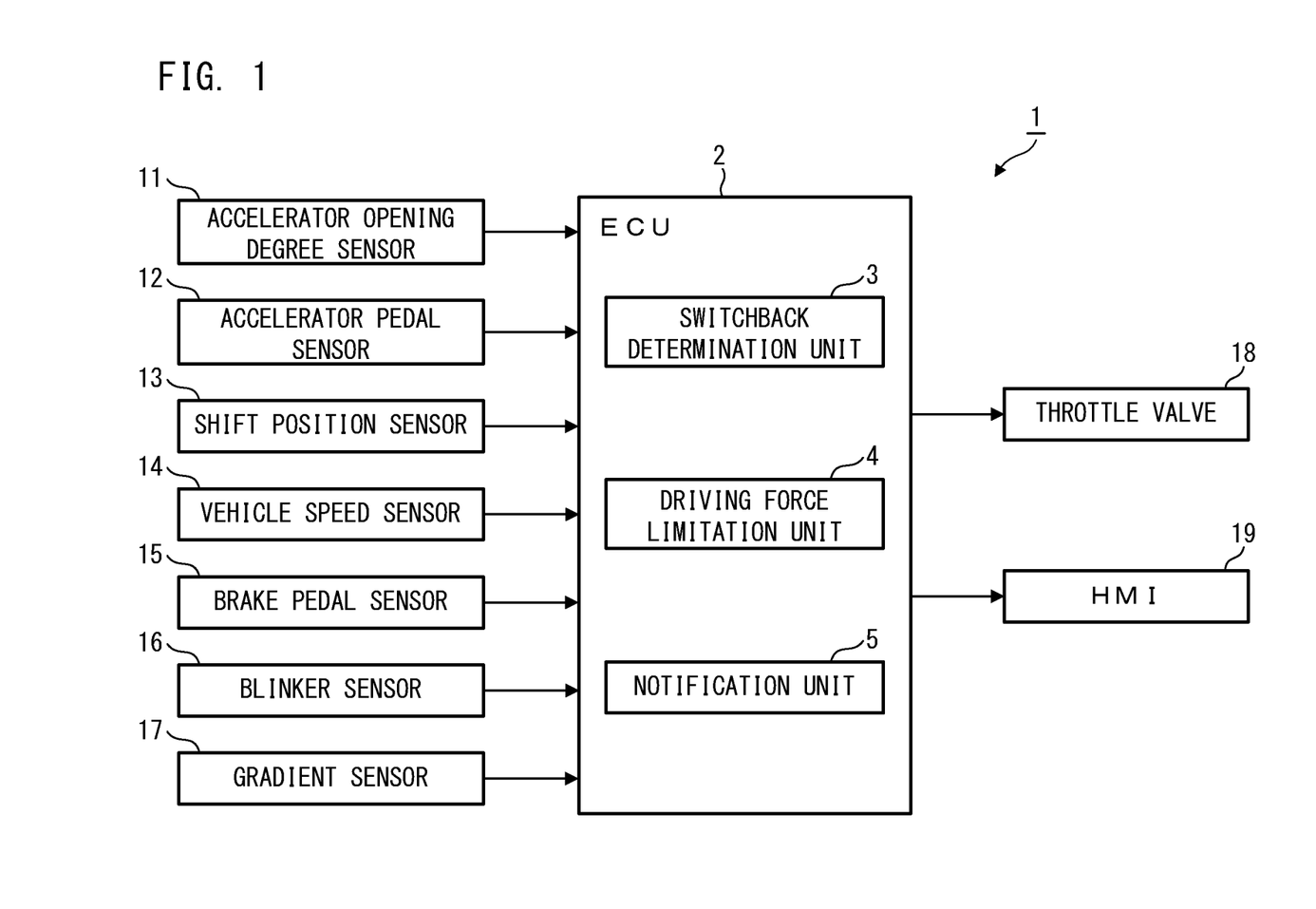
FIG. 1 is a block diagram illustrating a configuration of a driving support device according to one embodiment of the present invention.

Hereinafter, preferred embodiments of the present invention will be described in detail with reference to the drawings. FIG. 1 schematically illustrates a configuration of a driving support device according to one embodiment of the present invention. A driving support device 1 in the present embodiment is mounted on a vehicle such as an automobile, and is configured to be capable of conducting driving force limitation control for limiting the driving force in accordance with a traveling state of the vehicle.

The driving support device 1 includes an electronic control unit (ECU) 2 and various sensors, and the ECU 2 includes a microcomputer including a CPU, a RAM, a ROM, an I/O interface (none of which is illustrated), and the like. Sensors such as an accelerator opening degree sensor 11, an accelerator pedal sensor 12, a shift position sensor 13, a vehicle speed sensor 14, a brake pedal sensor 15, a blinker sensor 16, and a gradient sensor 17 are connected with the ECU 2, and detection signals of them are sequentially input.

The accelerator opening degree sensor 11 detects an accelerator opening degree of the vehicle, that is, an opening degree of a throttle valve 18. Information of an accelerator opening degree AP that has been detected by the accelerator opening degree sensor 11 is output to the ECU 2.

The accelerator pedal sensor 12 is a sensor for detecting a pressed amount by the driver onto the accelerator pedal, an accelerator pedal pressed speed calculated as an increase amount per unit time of the accelerator pedal pressed amount, and the like. Information including the pressed amount and the pressed speed that have been detected by the accelerator pedal sensor 12 is output to the ECU 2.

The shift position sensor 13 is a sensor for detecting an operation position of a shift switch or a shift lever (neither of which is illustrated) provided in the vicinity of a driver's seat in the interior of the vehicle. The shift switch/lever is for selecting various shift positions, for example, the D range for forward traveling, the R range for backward traveling, the P range for parking, and the like in accordance with its operation position. Information of the shift position that has been detected by the shift position sensor 13 is output to the ECU 2.

The vehicle speed sensor 14 is a sensor for detecting the speed of the vehicle, and information of the speed that has been detected is output to the ECU 2. The brake pedal sensor 15 is a sensor for detecting an operation amount by the driver onto the brake pedal, and information such as the operation amount onto the brake pedal that has been detected is output to the ECU 2. The blinker sensor 16 is a sensor for detecting a lighting state, an instruction direction, and the like of a direction indicator of the vehicle, and information such as the lighting state that has been detected is output to the ECU 2. The gradient sensor 17 is a sensor for detecting a gradient of a road surface on which the vehicle travels, and information of the gradient that has been detected is output to the ECU 2. Note that the gradient sensor may be replaced with an acceleration sensor.

The ECU 2 reads and executes a program stored in the ROM or the RAM to implement the functions of the respective units such as a switchback determination unit 3, a driving force limitation unit 4, and a notification unit 5.

The switchback determination unit 3 detects the advancing direction (forward or backward) at present of the vehicle, based on the vehicle speed at present and the like that has been input from the vehicle speed sensor 14. In addition, the advancing direction in accordance with the shift range of the vehicle is determined, based on the shift position at present of the vehicle that has been input from the shift position sensor 13. For example, in a case where the shift range is the D range, a forward direction is determined, and in a case where the shift range is the R range, a backward direction is determined. Then, in a case where the advancing direction at present of the vehicle and the advancing direction in accordance with the shift range do not match each other, it is determined that a switchback state is occurring.

The driving force limitation unit 4 conducts driving force limitation control of limiting the driving force of the vehicle, by limiting an upper limit value of the opening degree of the throttle valve 18 in a case where a predetermined driving force limitation prohibition condition to be described later is not satisfied and a determination that a sudden accelerator operation has been performed is satisfied. In addition, as will be described later, control of changing the magnitude of the limitation of the driving force is conducted in accordance with a determination result of the switchback determination unit 3. Note that in a case of an electric vehicle or a hybrid vehicle using a motor as a power source, it can be configured such that the driving force of the vehicle is limited by limiting an output of the motor, instead of limiting the opening degree of the throttle valve.

The notification unit 5 notifies the driver that the sudden accelerator operation has been detected, the function of suppressing the driving force is being activated, or the like via various types of a human machine interface (HMI) 19 when it is determined that the driver has performed a sudden accelerator operation. Examples of the notification via such an HMI include displaying a warning with characters on a display provided on a dashboard, a control panel, or the like, issuing an attention or a warning sound by audios from an in-vehicle speaker, and the like. However, without being limited to them, any kind of notification may be used, as long as it is possible to give a warning to the driver appropriately.

Figure 2:
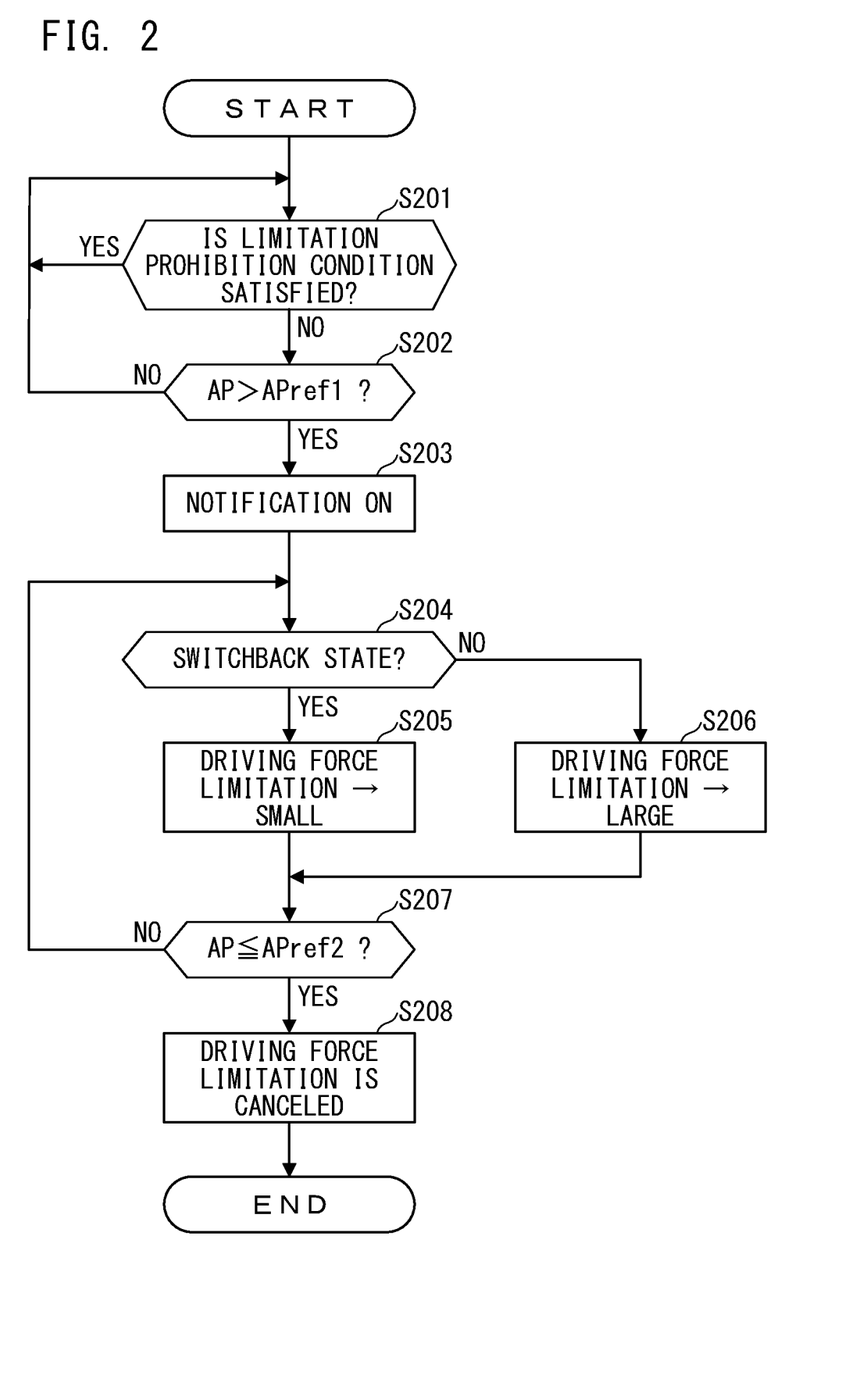
FIG. 2 is a flowchart illustrating control processing of driving force limitation in the driving support device according to one embodiment of the present invention.

FIG. 2 illustrates control processing of driving force limitation by the driving support device 1 in the present embodiment. The present processing is repeatedly performed at every predetermined time interval in a normal driving state of the vehicle. In this processing, first, in step 201 (indicated as "S201" in the drawing. The same applies, hereinafter), it is determined whether a predetermined limitation prohibition condition is satisfied. Such a limitation prohibition condition defines a traveling state in which control of limiting the driving force is considered to be unnecessary. In the present embodiment, for example, when a predetermined condition based on the vehicle speed is satisfied, it is determined that the limitation prohibition condition is satisfied. The driving force limitation unit 4 determines whether each of the above conditions is satisfied, based on the detection signal of each of the sensors 14 to 17 described above. Note that these limitation prohibition conditions are examples, and can be appropriately changed in accordance with the setting.

In a case where a determination result in step 201 is YES, it is determined that it is not necessary to limit the driving force in the traveling state at present, and the determination in step 201 is repeatedly performed without proceeding to the next step. On the other hand, in a case where the determination result of step 201 is NO, it is determined that there is a possibility that it is necessary to limit the driving force in the traveling state at present, and the processing proceeds to the next step 202.

In step 202, it is determined whether the current accelerator opening degree AP, which is increased or decreased based on an accelerator pedal operation, exceeds a predetermined first threshold accelerator opening degree APref1. This step 202 is a step for determining whether a sudden accelerator operation has been performed by the driver, and the first threshold accelerator opening degree APref1 is set to an accelerator opening degree large enough to determine that the sudden accelerator operation has been performed.

In a case where a determination result in step 202 is NO, it is determined that it is not in an accelerator opening degree by which it can be determined that the sudden accelerator operation has been performed, that is, the accelerator pedal operation is not detected to an extent that it can be determined that the sudden accelerator operation has been performed, and the determination in step 201 is performed again. On the other hand, in a case where the determination result of step 202 is YES, it is determined that the sudden accelerator operation has been performed, and the processing proceeds to the next step 203.

In step 203, a notification is given to the driver that the sudden accelerator operation has been detected or the function of suppressing the driving force is being activated via various types of the HMI provided in the vehicle, and then the processing proceeds to step 204. In the present embodiment, for example, a message such as "Suppression function for sudden acceleration is being activated", or "Please release the accelerator" is displayed in a blinking manner on a display provided in a control panel, and a warning sound is also emitted from an in-vehicle speaker to give the notification to the driver.

Then, in step 204, it is determined whether the vehicle is in a switchback traveling state at present. As the switchback traveling state, a case where "the shift range is the D range and the advancing direction of the vehicle is backward" and a case where "the shift range is the R range and the advancing direction of the vehicle is forward" are supposed.

In a case where a determination result in step 204 is YES, that is, in a case where the vehicle is in the switchback state, it is determined that the sudden accelerator operation of the driver is not an erroneous operation but is an intention of decelerating the reverse travel in the switchback state and accelerating the vehicle in the correct travel direction as described above. In step 205, the limit amount of the driving force is set to a small value (that is, the driving force is not largely limited), and the processing proceeds to the next step 207. Note that in the present embodiment, the limit amount of the driving force in step 205 is set to a minimum value. Here, the minimum value may be "0" (that is, there is no limitation at all).

On the other hand, in a case where the determination result in step 204 is NO, that is, the vehicle is not in the switchback state, in consideration of a possibility that the sudden accelerator operation of the driver is caused by an erroneous operation, the limit amount of the driving force is set to a large value (that is, the driving force is largely limited) for the purpose of preventing sudden acceleration of the vehicle in step 206, and the processing proceeds to step 207. Note that in the present embodiment, the limitation of the driving force in step 206 is conducted by setting the upper limit value of the opening degree of the throttle valve 18 to substantially 0%. Therefore, in this case, only the driving force corresponding to a creep phenomenon will work on the vehicle. Note that in this situation, in a case where the accelerator pedal is continuously pressed for a predetermined period of time or more, or in a case where the accelerator pedal is pressed a plurality of times within a short period of time, it can be considered that the operation onto the accelerator pedal is not performed by an erroneous operation, but is likely to be an acceleration request intended by the driver. In such a case, in consideration of both the possibility of an erroneous operation and the possibility of an acceleration request, it may be configured such that the upper limit value of the opening degree of the throttle valve 18 is set to be large, based on the accelerator pedal operation with a limitation (for example, within a range in which the vehicle speed is not equal to or higher than a predetermined limit value).

In step 207, it is determined whether the accelerator opening degree AP currently is equal to or smaller than a predetermined second threshold accelerator opening degree APref2, as a condition for ending the driving force limitation control. The second threshold accelerator opening degree APref2 is set to any accelerator opening degree by which it can be determined that the sudden accelerator operation of the driver has ended. The second threshold accelerator opening degree APref2 may be the same value with the first threshold accelerator opening degree APref1. In a case where this determination result is NO, that is, in a case where the accelerator opening degree AP still exceeds the second threshold accelerator opening degree APref2, the driving force is continuously limited, and the processing is repeated from the determination in step 204 again.

On the other hand, in a case where the determination result in step 207 is YES, that is, in a case where the accelerator opening degree AP becomes equal to or smaller than the second threshold accelerator opening degree APref2, it is determined that the sudden accelerator operation of the driver has ended, the limitation of the driving force is canceled in step 208, and the notification to the driver in step 203 is also canceled, and the present processing ends. Note that in order to prevent the vehicle from suddenly accelerating immediately after the limitation of the driving force is canceled, the limitation of the driving force may be gradually weakened over a certain period of time.

Figure 3:
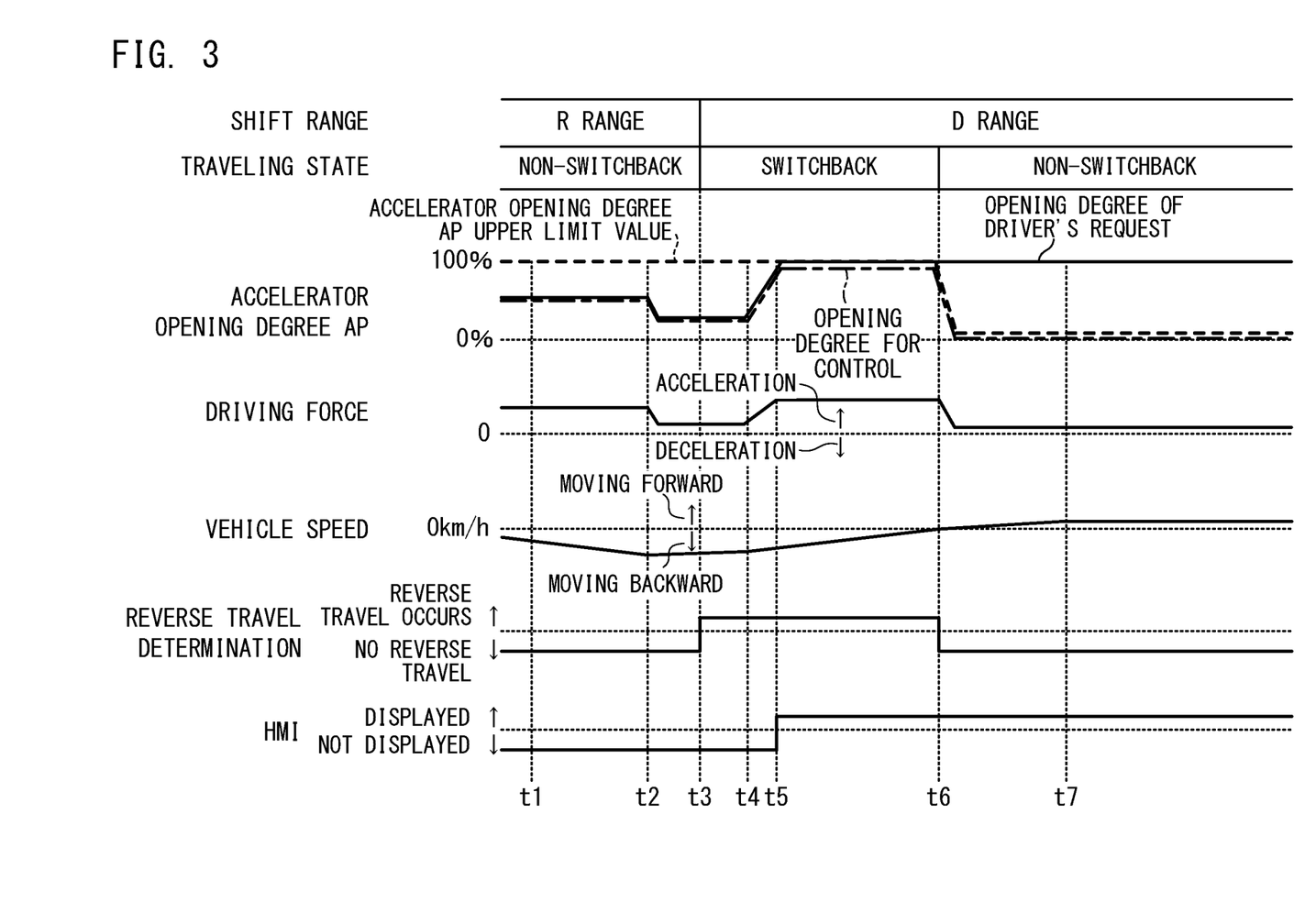
FIG. 3 is a timing chart illustrating an operation example when a switchback state occurs.

Next, an operation when a switchback state occurs will be described with reference to FIG. 3. The timing chart in the drawing illustrates an operation example when the switchback state occurs, because the shift range is switched from the R range to the D range while the vehicle is moving backward. In particular, it is assumed that a vehicle moves backward in the R range and leaves a parking space, and in a switchback state in which the shift range is switched to the D range while the vehicle is continuously moving backward, a sudden accelerator operation is performed by a driver who is in a hurry to start moving. Note that times t1 to t7 are illustrated for convenience of description. However, the width between the times is not necessarily same with the actual length of an elapsed time.

At time t1 in the drawing, the vehicle is moving backward in the R range. The accelerator opening degree AP indicating the accelerator pedal operation is moderate and no sudden accelerator operation is detected. Therefore, the driving force is not limited, and the upper limit value of the accelerator opening degree AP is set to 100%. In this timing, the switchback state does not occur, and the speed of the vehicle in the backward direction is gently increasing.

Thereafter, at time t2, pressing the accelerator pedal is loosened to decrease the accelerator opening degree AP, and then at time t3, the shift range is switched to the D range in a situation where the vehicle is moving backward, and thus it is determined that a switchback state has occurred in which the advancing direction (backward) of the vehicle and the advancing direction (forward) based on the shift range are different from each other.

Thereafter, at time t4, the driver starts the accelerator operation to increase the accelerator opening degree AP. Accordingly, the driving force working on the vehicle also starts to increase. The driving force in the forward direction works on the vehicle moving backward, and this promotes deceleration of the vehicle.

Thereafter, at time t5, when the accelerator opening degree AP exceeds the first threshold accelerator opening degree APref1, it is determined that a sudden accelerator operation has been performed by the driver, the notification is given to the driver via the HMI, and the driving force is also limited. However, since the vehicle is in the switchback state at this time point, the limit amount of the driving force is small, and the upper limit value of the accelerator opening degree AP is hardly limited. Therefore, the driving force in the forward direction largely works on the vehicle, and this further promotes the deceleration of the vehicle.

Thereafter, by the driving force in the forward direction working on the vehicle continuously, at a timing (time t6) when the advancing direction of the vehicle changes to forward from backward, the reverse travel of the vehicle is released, and it is determined that the vehicle has escaped from the switchback state. The driver is continuously performing the accelerator operation, and thus the notification is continuously given to the driver, and the driving force is also limited continuously. In this situation, the vehicle has already escaped from the switchback state, and thus the limit amount of the driving force increases, and the upper limit value of the accelerator opening degree is set to around 0%. The accelerator operation of the driver is continuously performed also at a subsequent time t7, the driving force is also limited continuously, and the driving force that works on the vehicle is limited to the driving force corresponding to the creep phenomenon.

As described heretofore, according to the driving support device 1 in the present embodiment, the driving force is limited when the sudden accelerator operation of the driver is detected, so that the sudden acceleration caused by the erroneous operation of the driver can be prevented appropriately. In addition, even though the sudden accelerator operation is detected, and in a case where the vehicle is in the switchback state, the limit amount of the driving force is set to be small, assuming that the sudden accelerator operation is not caused by an erroneous operation but is caused by an intention of decelerating the reverse travel of the vehicle and accelerating the vehicle in the correct travel direction. Accordingly, it is possible to suppress a reduction of the deceleration force of the vehicle caused by the driving force of the vehicle being largely limited in a switchback state, and to prevent an increase of a moving distance caused by the reverse travel of the vehicle in the switchback state.

In addition, even in a case where the limitation of the driving force in the switchback state is set to be small, thereafter, when the switchback state is released, the driving force is largely limited again. Therefore, when the driver performs a sudden accelerator operation in the switchback state, the driving force is largely limited at the timing when the advancing direction of the vehicle changes from the reverse travel to the correct travel. Therefore, sudden start of the vehicle immediately after the vehicle has escaped from the switchback state can be prevented appropriately.

Further, when the sudden accelerator operation of the driver is detected, this is notified to the driver, so that the driver can be made to recognize a possibility of sudden acceleration and to be conscious of safe driving.

Next, a driving support device 101 according to a second embodiment of the present invention will be described with reference to FIG. 4. The configuration of the driving support device 101 is substantially the same as that of the driving support device 1 in the above-described embodiment, but is different from the above-described embodiment in that a determination when limiting the driving force is made also by use of a detection signal of the accelerator pedal sensor 12, as a parameter indicating the accelerator pedal operation, in addition to the accelerator opening degree AP. Hereinafter, a description will be given specifically.

Figure 4:
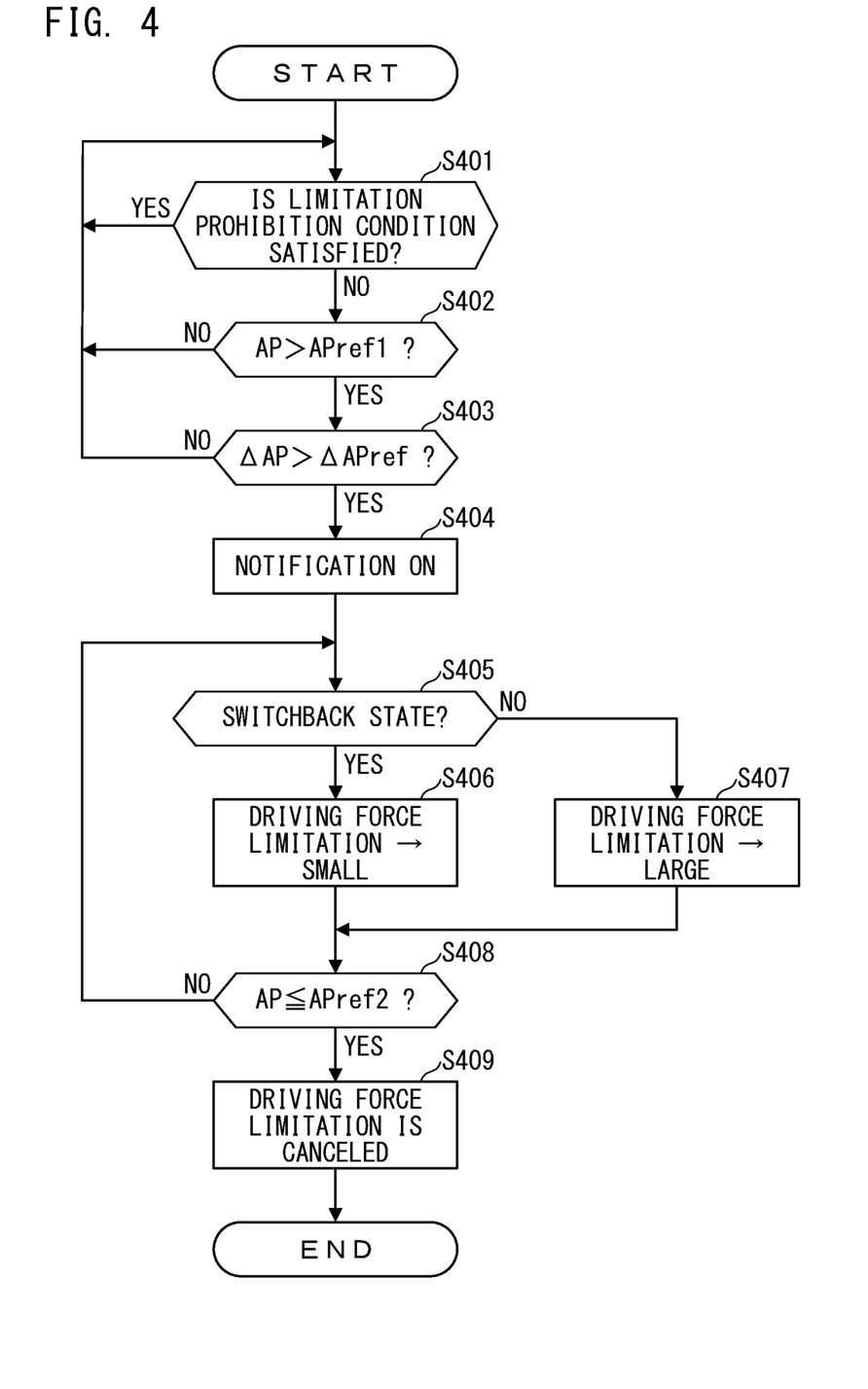
FIG. 4 is a flowchart illustrating control processing of driving force limitation in a driving support device according to another embodiment.

In the control processing illustrated in FIG. 4, the processing is similar to the processing in steps 201 and 202 in FIG. 2 until it is determined whether the limitation prohibition condition is satisfied in step 401 and whether the accelerator opening degree AP exceeds the predetermined first threshold accelerator opening degree APref1 in step 402. However, in the second embodiment, determination processing in step 403 is further added in order to more accurately detect that the driver has performed a sudden accelerator operation.

In step 403, it is determined whether a pressed speed ΔAP, which is calculated as an increase amount per unit time of the pressed amount onto the accelerator pedal that has been detected by the accelerator pedal sensor, exceeds a predetermined threshold speed ΔAPref. The threshold speed ΔAPref can be set as any value enough to determine that the driver has performed the sudden accelerator operation.

In a case where a determination result in step 403 is NO, it is determined that the pressed speed is not enough to determine that the sudden accelerator operation has been performed, and the processing returns to step 401 to make a determination again. On the other hand, in a case where the determination result of step 403 is YES, it is determined that the sudden accelerator operation has been performed, and the processing proceeds to the next step 404.

The processing of steps 404 to 409 is similar to the processing of steps 203 to 208 of FIG. 2. A limit amount of the driving force is changed depending on whether the vehicle is in the switchback state. In a case where the accelerator opening degree AP becomes equal to or smaller than a predetermined value, the limitation of the driving force is canceled and the notification to the driver is also canceled, and the processing ends.

As described heretofore, the driving support device 101 in the second embodiment determines whether the driver has performed a sudden accelerator operation by referring to two parameters that are the accelerator opening degree and the accelerator pedal pressed speed. Therefore, the presence or absence of the sudden accelerator operation can be determined more accurately, and the driving force is limited only in a really necessary situation, so that drivability can be improved.

Note that the present invention is not limited to the embodiments that have been described, and can be implemented in various modes. For example, in the above-described embodiments, the description has been given with regard to the configuration in which the upper limit value of the accelerator opening degree AP is hardly limited as the limitation of the driving force in a case where the vehicle is in the switchback state. However, the limit amount of the driving force in the switchback state can be set to any value smaller than the limit amount in a case where the vehicle is not in the switchback state. In a configuration of limiting the driving force to some extent also in the switchback state, an occurrence of sudden deceleration in the reverse traveling state can also be prevented.

In addition, in the embodiments, the upper limit value of the accelerator opening degree is set to substantially 0% as the limitation of the driving force in a case where the vehicle is not in the switchback state. However, the upper limit value of the accelerator opening degree may be changed so that the vehicle speed becomes equal to or lower than a predetermined value. In addition, the detailed configuration can be appropriately changed within the scope of the gist of the present invention.

What is claimed is:

1. A driving support device comprising:
   an accelerator opening degree sensor or an accelerator pedal sensor configured to detect an accelerator pedal operation of a vehicle;
   a vehicle speed sensor configured to detect an advancing direction at present of the vehicle;
   a shift position sensor configured to detect a shift range at present of the vehicle; and
   an ECU is configured to determine that a switchback state is occurring, in which the advancing direction that has been detected is opposite to an advancing direction based on the shift range that has been detected; wherein
   the ECU is configured to limit a driving force of the vehicle when an operation amount of the accelerator pedal operation that has been detected exceeds a predetermined threshold value, and
   also configured to set a limit amount of the driving force while the switchback state is occurring to be smaller than a limit amount of the driving force while no switchback state is occurring.

2. The driving support device according to claim 1, wherein while the switchback state is occurring, the ECU minimizes the limit amount of the driving force.

3. The driving support device according to claim 1, wherein while the switchback state is occurring, the ECU prohibits limitation of the driving force, regardless of the accelerator pedal operation that has been detected.

4. The driving support device according to claim 3, wherein while the ECU prohibits the limitation of the driving force and no switchback state is occurring, the ECU cancels prohibition of the limitation the driving force, and limits the driving force.

5. The driving support device according to claim 1, further comprising a notification unit configured to notify a driver of the vehicle, when at least a predetermined accelerator pedal operation is detected.

* * * * *